(12) United States Patent
He

(10) Patent No.: US 10,500,483 B2
(45) Date of Patent: Dec. 10, 2019

(54) INFORMATION PROCESSING METHOD AND APPARATUS, STORAGE MEDIUM, AND ELECTRONIC DEVICE

(71) Applicant: NETEASE (HANGZHOU) NETWORK CO., LTD, Zhejiang (CN)

(72) Inventor: Zhaoda He, Zhejiang (CN)

(73) Assignee: NETEASE (HANGZHOU) NETWORK CO., LTD., Zhejiang (CN)

( * ) Notice: Subject to any disclaimer, the term of this patent is extended or adjusted under 35 U.S.C. 154(b) by 0 days.

(21) Appl. No.: 16/106,074

(22) Filed: Aug. 21, 2018

(65) Prior Publication Data

US 2019/0070495 A1    Mar. 7, 2019

(30) Foreign Application Priority Data

Sep. 1, 2017 (CN) .......................... 2017 1 0781069

(51) Int. Cl.
*A63F 13/00* (2014.01)
*A63F 13/2145* (2014.01)
(Continued)

(52) U.S. Cl.
CPC .......... *A63F 13/2145* (2014.09); *A63F 13/22* (2014.09); *A63F 13/426* (2014.09);
(Continued)

(58) Field of Classification Search
None
See application file for complete search history.

(56) References Cited

U.S. PATENT DOCUMENTS 8,675,019 B1 *  3/2014  Feinstein .............. G09G 5/026
                                                            345/634
2005/0110768 A1 *  5/2005  Marriott .............. G06F 3/03547
                                                            345/173
(Continued)

FOREIGN PATENT DOCUMENTS

CN        1728058 A        2/2006
CN        1877590 A       12/2006
(Continued)

OTHER PUBLICATIONS

Search report of CN Priority application No. 201710781069.6, dated Jun. 22, 2018.
(Continued)

*Primary Examiner* — Paul A D'Agostino
(74) *Attorney, Agent, or Firm* — Gang Yu

(57) ABSTRACT

An information processing method and apparatus, a storage medium, and an electronic device are provided. The method includes: a touch area is provided on a graphical user interface, and a virtual character is configured to move in a game scene according to a touch operation received in the touch area; when a signal triggering operation acting on at least one signal icon is detected, a position selection assisting area is provided on the graphical user interface, and a touch sliding operation is detected acting on the position selection assisting area; when the touch sliding operation is detected, a position indicator is provided in a mini-map, and the position of the position indicator is updated in the mini-map according to the touch sliding operation; and when the end of the touch sliding operation is detected, a prompt signal corresponding to the at least one signal icon is sent.

20 Claims, 3 Drawing Sheets

(51) Int. Cl.
*A63F 13/22* (2014.01)
*A63F 13/428* (2014.01)
*A63F 13/5255* (2014.01)
*A63F 13/92* (2014.01)
*A63F 13/426* (2014.01)
*A63F 13/847* (2014.01)
*A63F 13/5378* (2014.01)

(52) U.S. Cl.
CPC ........ *A63F 13/428* (2014.09); *A63F 13/5255* (2014.09); *A63F 13/5378* (2014.09); *A63F 13/847* (2014.09); *A63F 13/92* (2014.09)

(56) References Cited

U.S. PATENT DOCUMENTS

| | | | | |
|---|---|---|---|---|
| 2007/0238529 | A1* | 10/2007 | Iwamoto | H04W 4/60 463/42 |
| 2008/0146328 | A1* | 6/2008 | Ishii | A63F 13/10 463/31 |
| 2011/0256912 | A1* | 10/2011 | Baynes | A63F 13/803 463/6 |
| 2011/0273473 | A1* | 11/2011 | Kim | G06T 19/00 345/629 |
| 2012/0007854 | A1* | 1/2012 | Cho | G06F 3/04883 345/419 |
| 2012/0194461 | A1* | 8/2012 | Lim | G06F 3/03547 345/173 |
| 2012/0223894 | A1* | 9/2012 | Zhao | G06F 3/0488 345/173 |
| 2013/0127980 | A1* | 5/2013 | Haddick | G06F 3/013 348/14.08 |
| 2014/0191977 | A1* | 7/2014 | Feng | G06F 3/018 345/173 |
| 2014/0243089 | A1* | 8/2014 | Tsukioka | A63F 13/12 463/31 |
| 2014/0245367 | A1* | 8/2014 | Sasaki | H04N 21/4402 725/109 |
| 2014/0368441 | A1* | 12/2014 | Touloumtzis | G06F 3/017 345/173 |
| 2014/0379946 | A1* | 12/2014 | Zhang | G06F 3/038 710/67 |
| 2016/0059131 | A1* | 3/2016 | Ye | A63F 13/537 463/31 |

FOREIGN PATENT DOCUMENTS

| | | |
|---|---|---|
| CN | 102567642 A | 7/2012 |
| CN | 103177178 A | 6/2013 |
| CN | 105214306 A | 1/2016 |
| CN | 105597310 A | 5/2016 |
| CN | 106598465 A | 4/2017 |
| CN | 107008003 A | 8/2017 |

OTHER PUBLICATIONS

Cheng, Hexia et al., "Advanced technology research of mobile game map design", vol. No. 26, issue No. 8, Dec. 31, 2010, pp. 9-10.

* cited by examiner

INFORMATION PROCESSING METHOD AND APPARATUS, STORAGE MEDIUM, AND ELECTRONIC DEVICE

CROSS-REFERENCE TO RELATED APPLICATIONS

The present disclosure claims priority of Chinese Patent Application No. 201710781069.6, filed on Sep. 1, 2017 and named after "Information Processing Method and Apparatus, Storage Medium, and Electronic Device". Contents of the present disclosure are hereby incorporated by reference in entirety of the Chinese Patent Application.

TECHNICAL FIELD

The present disclosure relates to the technical field of computer interaction, and in particular to an information processing method and apparatus, a storage medium, and an electronic device.

BACKGROUND

With development of intelligent mobile terminals and game industry, a lot of mobile games with different themes emerge to meet requirements of players. Multiple players in groups for battle in games may be a core gameplay for many mobile games. For example, the core gameplay for Multi-player Online Battle Arena (MOBA) mobile games is 5V5 group battle. In a process of players in groups for battle in the game, communication and cooperation among the players are crucial. Therefore, whether a convenient and rapid interaction mechanism can be provided for communication among the players or not is an important influencing factor on player experience in such type of mobile games.

In view of the above problems, no effective solution has yet been proposed.

SUMMARY

At least one embodiment of the present disclosure provides an information processing method and apparatus, a storage medium and an electronic device, so as at least to overcome, to some degree, a problem of inconvenient triggering interaction in sending at least one prompt signal due to limitations and disadvantages of the related art.

In an embodiment of the present disclosure, an information processing method is applied to a mobile terminal having at least one processor for executing a software application and a touch screen which is rendered with a graphical user interface, contents rendered on the graphical user interface include a game scene, a virtual character, a mini-map, and at least one signal icon. The method includes that:

providing a touch area on the graphical user interface, and configuring the virtual character to move in the game scene according to a touch operation received in the touch area; when a signal triggering operation acting on the at least one signal icon is detected, providing a position selection assisting area on the graphical user interface, and detecting a touch sliding operation acting on the position selection assisting area; when the touch sliding operation is detected, providing a position indicator in the mini-map, and updating a position of the position indicator in the mini-map according to the touch sliding operation; and when an end of the touch sliding operation is detected, sending a prompt signal corresponding to the at least one signal icon, the prompt signal including position indication information of the game scene.

In another embodiment of the present disclosure, an information processing apparatus is applied to a mobile terminal having at least one processor for executing a software application and a touch screen which is rendered with a graphical user interface, contents rendered on the graphical user interface include a game scene, a virtual character, a mini-map, and at least one signal icon. The apparatus includes:

an interaction element, configured to provide a touch area on the graphical user interface, and configure the virtual character to move in the game scene according to a touch operation received in the touch area; a detection element, configured to provide, when detecting a signal triggering operation acting on the at least one signal icon, a position selection assisting area on the graphical user interface, and detect a touch sliding operation acting on the position selection assisting area; a signal processing element, configured to provide, when detecting the touch sliding operation, a position indicator in the mini-map, and update a position of the position indicator in the mini-map according to the touch sliding operation; and a signal sending element, configured to send, when detecting the touch sliding operation is ended, a prompt signal corresponding to the at least one signal icon, the prompt signal including position indication information of the game scene.

In another embodiment of the present disclosure, a computer-readable storage medium is provided, on which at least one computer program may be stored, and the at least one computer program may be executed by at least one processor to implement the information processing method.

In another embodiment of the present disclosure, an electronic device is provided. The electronic device includes: at least one processor; and at least one memory, connected with the at least one processor, and configured to store at least one executable instruction of the at least one processor, and the at least one processor is configured to execute the information processing method by executing the executable instruction.

The method provided in at least one embodiment of the present disclosure at least partially solves a technical problem that a signal sending mode is single in a game operated in a mobile terminal and at least one custom position cannot be accurately provided.

DETAILED DESCRIPTION

In order to make those skilled in the art better understand the solutions of the present disclosure, the technical solutions in the embodiments of the present disclosure will be described clearly and completely below with reference to the accompanying drawings in embodiments of the present disclosure.

In most mobile games provided in the related art, the way of sending signals for communication is single and signals are sent by using a coherent input mode such as clicking on a signal button or clicking on a mini-map. For example, a mobile game "King of Glory" provides the following two signal sending modes.

At mode one, signal communication is performed by clicking on a signal button. This signal sending mode is single, it is possible to determine an identified position of a signal on a mini-map as a current position of a virtual character controlled by a player, and the position of the virtual character cannot be customized.

At mode two, signal communication is performed by clicking on an expanded mini-map. That is, a certain position on the mini-map is clicked in order that at least one teammate receives a prompt signal. Although the signal sending mode can identify a specific position, two steps are needed. Moreover, after the mini-map is zoomed in, a left screen is seriously blocked out, thereby affecting battle information captured by the player and at least one operation such as movement of virtual joystick of the player, so that the coherence of game operations is affected. Meanwhile, this mode has not yet achieved a checking function for a scene at an actual sending position when the player sends the prompt signal. Therefore, an accurate position for sending the prompt signal in the game scene cannot be provided.

Figure 1:
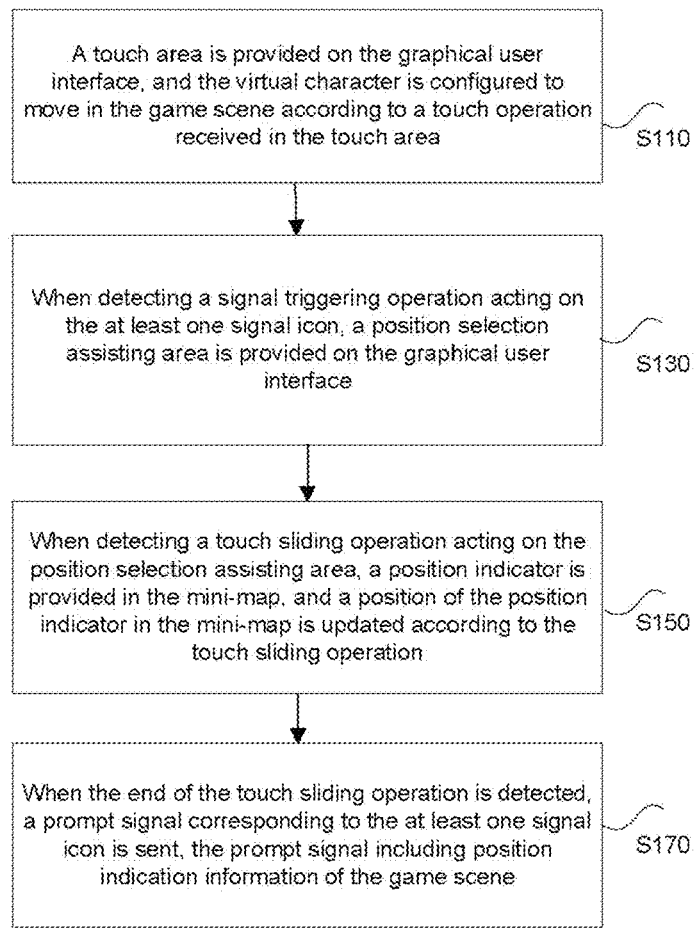
FIG. 1 is a flowchart of an information processing method according to an exemplary embodiment of the present disclosure.

In an embodiment of the present disclosure, an information processing method is provided. This method is applied to a mobile terminal having at least one processor for executing a software application and a touch screen which is rendered with a graphical user interface. Contents rendered on the graphical user interface include a game scene, a virtual character, a mini-map, and at least one signal icon. As shown in FIG. 1, the method may include the steps as follows.

At step S110, a touch area is provided on the graphical user interface, and the virtual character is configured to move in the game scene according to a touch operation received in the touch area.

At step S130, when detecting a signal triggering operation acting on the at least one signal icon, a position selection assisting area is provided on the graphical user interface.

At step S150, when detecting a touch sliding operation acting on the position selection assisting area, a position indicator is provided in the mini-map, and a position of the position indicator in the mini-map is updated according to the touch sliding operation.

At step S170, when the end of the touch sliding operation is detected, a prompt signal corresponding to the at least one signal icon is sent, the prompt signal including position indication information of the game scene.

With the method in the present embodiment, it is possible to send a custom position in a game scene, and a touch sliding mode in this method is more consistent with the user's operation habit in playing a mobile game. In addition, the number of operating steps during the game would be reduced by this method. That is, a signal icon is touched by a finger, and then the finger slides to a specified position, and the process of signal sending is completed after the finger left from the specified position, thus sending signal at the specified position can be triggered by one single hand. With the method provided in the present embodiment, on the one hand, the content of signal is rich, namely including operation information such as "attack" and "gather", as well as specified position information, so that players can communicate and operate more conveniently in the game, and the availability and usability of signal sending can be further improved. On the other hand, when the signal is sent, the touch area on the left side is not blocked, the controlling of the virtual character by a player is not affected, and game experience is enhanced.

In the following, the steps of the information processing method in the present exemplary embodiment will be further described with reference to FIG. 2 to FIG. 4.

A graphical user interface 200 is rendered on a touch display screen of a mobile terminal. Contents rendered on the graphical user interface 200 include a game scene (not shown in the figures), a virtual character 210, a mini-map 220, and three signal icons namely a signal icon A, a signal icon B and a signal icon C. Preset instruction information corresponding to each signal icon may be set as default by a system, and may also be preset by a player through a preset function. For example, the preset instruction information corresponding to the signal icon may be "retreat", "gather", "attack", "be careful", and so on. The signal icons corresponding to different instruction information may be independently disposed on the graphical user interface 200, or may also be enclosed in the signal icon in the form of sub-icons, when a finger clicks on the signal icon, the signal sub-icons corresponding to different instruction information are expanded. The number of signal icons and the arrangement mode are not specifically limited in the present exemplary embodiment.

At step S110, a touch area is provided on the graphical user interface, and the virtual character is configured to move in the game scene according to a touch operation received in the touch area.

Figure 2:
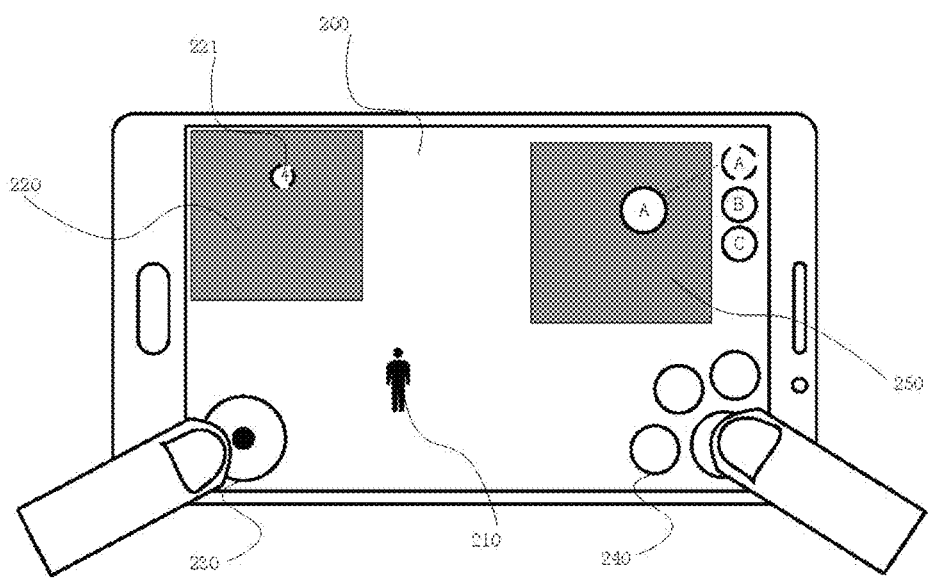
FIG. 2 is a schematic diagram of a first state of a graphical user interface according to an exemplary embodiment of the present disclosure.

As shown in FIG. 2, a touch area 230 is provided on the graphical user interface 200. The touch area 230 may be a virtual joystick control area, a direction control virtual button area and so on. The present exemplary embodiment is not limited to a way of configuring the touch area. The touch area 230 is provided on the graphical user interface 200, and when detecting the touch operation acting on the touch area 230, the virtual character 210 may be controlled to perform at least one of movement and turn around in the game scene according to the touch operation received in the touch area 230.

In an embodiment of the present disclosure, the touch area 230 is a virtual joystick control area. The virtual joystick control area is located at the lower left of the graphical user interface 200. The virtual character 210 is controlled to perform at least one of movement and turn around in the game scene according to a touch operation received in the virtual joystick control area. Multiple skill controls 240 are provided at the lower right of the graphical user interface for providing the player with a control function of sending skills. Therefore, in the present embodiment, the virtual character may be controlled with the left hand to be displaced and rotated in the game scene, and the skills may be sent by controlling the skill controls with the right hand.

As an optional embodiment, the touch area 230 is a visible area. For example, the touch area 230 may have a bounding box, or the touch area 230 may rendered with a color, or the touch area 230 may rendered with predetermined transparency, or adopt other modes to distinguish the touch area 230 visually. The virtual character 210 is controlled to perform at least one of movement and turn around in the game scene according to a touch operation such as sliding and clicking received in the touch area 230. A visual area can be positioned quickly by player, and the operation difficulty for a game novice would be reduced.

As another optional embodiment, the touch area 230 may be set as an invisible area on the graphical user interface 200. Thus the touch area 230 may not cover or affect the game screen and it can save the screen space and provide a better view for players. However, since the touch area may be set as invisible, and it is hard to be sensed by a player. As an optional implementation solution, a visual guide control may be displayed in the touch area 230. For example, in an embodiment of the present disclosure, when a virtual joystick is used as a direction controlling solution of a virtual character 210, the virtual joystick may be displayed in the touch area 230 to visually guide the player.

At step S130, when detecting a signal triggering operation acting on a signal icon, a position selection assisting area is provided on the graphical user interface.

Figure 3:
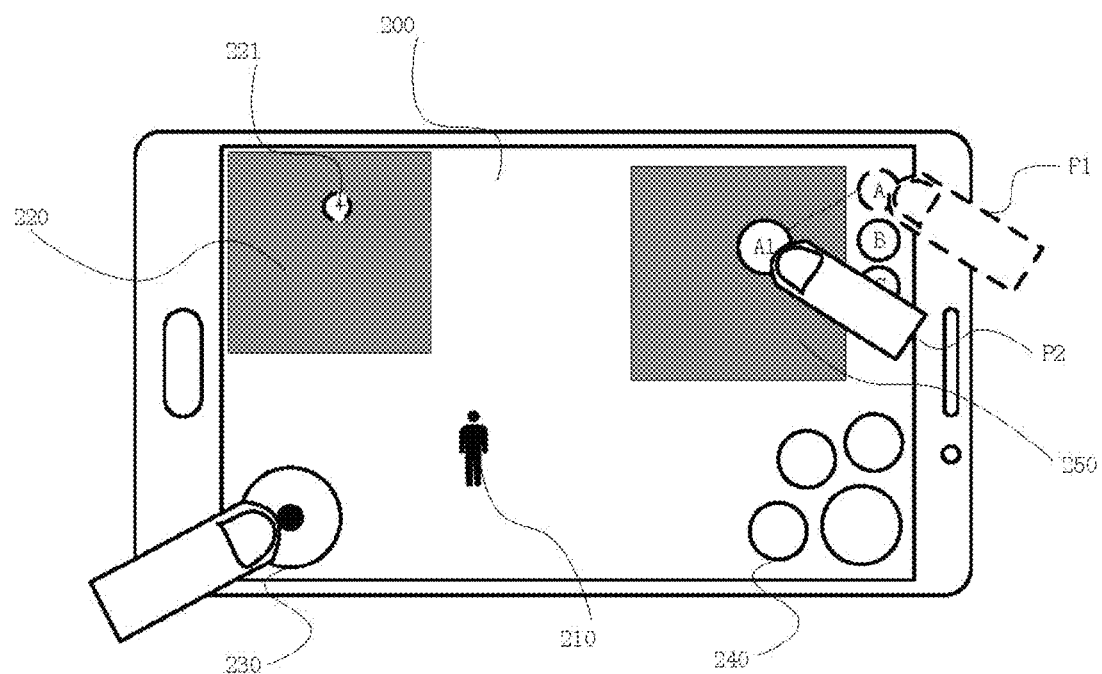
FIG. 3 is a schematic diagram of an operating state of a graphical user interface according to an exemplary embodiment of the present disclosure.

As shown in FIG. 3, when detecting a signal triggering operation acting on a signal icon such as the signal icon A, a position selection assisting area 250 is provided on the graphical user interface 200.

In an embodiment of the present disclosure, the signal triggering operation refers to a touch sliding operation acting on the signal icon A with a sliding distance exceeds a preset distance. Specifically, when detecting a touch sliding operation acting on the signal icon A with a sliding distance exceeds a preset distance, a position selection assisting area 250 is provided on the graphical user interface 200. That is, after the finger touches the signal icon A, if the moving distance of the finger is greater than a preset distance, the touch sliding operation may be regarded as the signal triggering operation. For example, the finger moves from a position P1 where the signal icon A is located to a position P2. When the distance between the position P1 and the position P2 is greater than the preset distance, the position selection assisting area 250 is generated at the upper right of the graphical user interface 200. At this time, if the signal triggering operation needs to be canceled, the finger is moved out of the position selection assisting area 250. After the finger touches the signal icon A, if the moving distance of the finger is smaller than a preset distance, a signal is directly sent, and the position of the signal is the position of the virtual character 210 in the game scene, so as to ensure operation coherence.

As an optional embodiment of the present disclosure, the signal triggering operation refers to a touch sliding operation acting on the signal icon A with a sliding time exceeds a preset duration. Specifically, when detecting a touch sliding operation acting on the signal icon A with a sliding time exceeds a preset duration, a position selection assisting area 250 is provided on the graphical user interface 200. That is, when a touch time that a player touches the signal icon A for over a preset duration, the position selection assisting area 250 is triggered to be generated. In this case, when the touch of the player on the signal icon A is ended within the preset duration, a signal is directly sent, and the position of the signal is the position of the virtual character 210 in the game scene. The present embodiment can ensure the operation coherence and the mis-operation probability of the player can be effectively reduced.

As an optional embodiment of the present disclosure, the signal triggering operation refers to a click operation on the signal icon A. Specifically, when detecting a click operation on the signal icon A, a position selection assisting area 250 is provided on the graphical user interface 200. That is, when the finger of the player leaves the signal icon A immediately after touching the signal icon A, or when the finger leaves the signal icon A after touching the signal icon A for a preset time, the touch sliding operation may be regarded as the signal trigger operation. That is, after completing a click operation on the signal icon A, the position selection assisting area 250 is triggered to be generated. At this time, a position selection assisting area 250 is provided at the upper right of the graphical user interface 200. If the signal triggering operation needs to be canceled, the finger clicks on the signal icon A again, or clicks on a certain position beyond the position selection assisting area 250.

As another optional embodiment of the present disclosure, the signal triggering operation refers to a touch operation acting on the signal icon A. Specifically, when detecting a touch operation acting on the signal icon A, a position selection assisting area 250 is provided on the graphical user interface 200. That is, an operation of touching the signal icon A by the finger of the player may be served as a signal triggering operation. Different from the above embodiment, as long as the finger of the player touches the signal icon A, the position selection assisting area 250 is triggered to be generated regardless of the duration of the touch operation, regardless of whether the touch operation is ended, and regardless of whether to continue sliding after touching. The present embodiment has the advantage of high control efficiency, so that the player can quickly trigger the position selection assisting area 250, thus performing position selection in the position selection assisting area 250.

In an embodiment of the present disclosure, the position selection assisting area 250 is a visible area having an outer contour geometrically similar to the outer contour geometrically of the mini-map 220 on the graphical user interface 200. Specifically, the position selection assisting area 250 is rendered on the graphical user interface 200 with preset transparency, and the position selection assisting area 250 as a visible area can be positioned quickly by the player, thereby reducing the operation difficulty for a game novice. Meanwhile, the position selection assisting area 250 has certain transparency and does not block the current game scene, and the player can capture battle information in real time. It can be understood that in other embodiments, the position selection assisting area 250 may have a bounding box, or render the position selection assisting area 250 with a color, or adopt other modes to distinguish the position selection assisting area 250 visually.

As an optional embodiment, the position selection assisting area 250 may also be an invisible area on the graphical user interface 200. The position selection assisting area 250 cannot cover or affect the game screen and it can save the screen space and provide a better view for players.

As another optional embodiment, the position selection assisting area 250 may also be the entire of the game scene or a part of the game scene. Specifically, the position selection assisting area 250 is a thumbnail of the entire game scene, or may be a thumbnail of a local part of the game scene currently presented on the graphical user interface of a client. At this time, position information in the position selection assisting area 250 may be in a one-to-one mapping relationship with position information in the game scene. That is, in this optional embodiment, the position selection assisting area 250 is equivalent to the mini-map 220. In an optional embodiment, the position selection assisting area 250 is generated in a preset area around the signal icon. In this way, a player can conveniently and coherently select the aim position by performing the touch operation within a small area. In addition, the position selection assisting area may be the thumbnail of the entire game scene or the local part of the game scene. The touch operation is performed in the thumbnail, so that at least one of characters and positions to be indicated can be intuitively selected.

At step S150, when detecting a touch sliding operation acting on the position selection assisting area, a position indicator is provided in the mini-map, and the position of the position indicator in the mini-map is updated according to the touch sliding operation.

The position indicator 221 is used for indicating the position in the mini-map 220. An initial position of the position indicator 221 may be a preset position in the mini-map 220 (for example, a central position of the mini-map 220), or may be a position associated with the position of the virtual character 210 (for example, the current position of the virtual character 210 in the game scene is a point D11, the point D11 in the game scene corresponds to a point D22 in the mini-map, and the initial position of the position indicator 221 is located at the point D22 in the mini-map), or may also be any other position. Generating the position indicator 221 in the center of the mini-map 220 is convenient for players to control the movement of the position indicator 221 from the initial position to the indicated positions in the mini-map 220 with less touch operations. The position indicator 221 is generated at the position where the virtual character controlled by the player is located in the mini-map 220, which enables the player to control the position indicator 221 to indicate the position near the virtual character of the player with less touch operations.

As shown in FIG. 3, in an embodiment of the present disclosure, when detecting the touch sliding operation acting on the position selection assisting area 250, a position indicator 221 is provided in the mini-map 220, and the position of the position indicator 221 in the mini-map 220 is updated according to the touch sliding operation. Specifically, the position of the position indicator 221 in the mini-map 220 is controlled according to the sliding track of the detected touch sliding operation acting on the position selection assisting area 250. For example, as shown in FIG. 3, the finger of the player slides from the position P1 to the position P2, and the position of the position indicator 221 in the mini-map 220 is updated according to the sliding track from the position P1 to the position P2.

Optionally, for ease of being recognized by players, when detecting the touch sliding operation acting on the position selection assisting area 250, signal icon A1 is generated in the position selection assisting area 250, and moves along with the movement of the finger in the position selection assisting area 250. At this time, the signal icon A is visually displayed to be blurred or grayed. For example, if the finger of the player stays at the position P2, a signal icon A1 is generated at the P2 position. That is, the position of the position indicator 221 corresponds to the position of the signal icon A1. The signal icon A and the signal icon A1 appear visually identical. For ease of description, the signal icons A and A1 are used to distinguish. It can be understood that in other embodiments, the signal icon A1 may not be generated, but other visual objects that can be moved according to the touch position of the finger of the player may be generated to facilitate player recognition and provide visual feedback of touch sliding.

At step S170, when the end of the touch sliding operation is detected, a prompt signal corresponding to the at least one signal icon is sent, the prompt signal including position indication information of the game scene.

Specifically, the current touch point of the touch sliding operation is located within the position selection assisting area 250. When the end of the touch sliding operation is detected, a prompt signal is sent, the prompt signal including position indication information of the game scene. That is, when the player releases the finger or other touch objects leave the screen, the touch sliding operation is regarded to be ended, and a corresponding prompt signal is sent. The prompt signal includes position indication information of the game scene.

In an optional embodiment, the position indication information of the game scene includes position information in the game scene corresponding to the current position of the position indicator 221 within the area of the mini-map 220.

For example, when detecting the touch sliding operation is ended, the position of the position indicator 221 within the area of the mini-map 220 is a point D1. According to a corresponding relationship between the mini-map 220 and the game scene, a position point D2 in the game scene may be determined. Position indication information of the game scene includes position indication information of the point D2. Or, when detecting the touch sliding operation is ended, the position of the position indicator 221 within the area of the mini-map 220 is a point D3. According to a corresponding relationship between the mini-map and the game scene, a position point D4 in the game scene may be determined, the point D4 is located in a specific area Z1 (e.g., a jungle Z1) in the game scene, and the position indication information of the game scene includes the position indication information of the specific area Z1.

The function of the prompt signal is used for prompting other players in the game (e.g., teammates in a team game). Therefore, the prompt signal may be sent to teammates through a game server, so that a corresponding signal is displayed in the game graphical user interface of devices controlled by the teammates. Of course, corresponding signals may also be sent in game graphical user interfaces of devices controlled by all teammates or all players.

In an embodiment of the present disclosure, after sending the prompt signal, the position of a game scene indicated by the position indication information of the game scene is identified in the mini-map 220.

In other embodiments, when receiving a prompt signal sent by other terminals, the position of a game scene indicated by the position indication information of the game scene may be identified in the mini-map 220.

One of the technical problems to be solved by the present disclosure is to provide an interaction mechanism capable of sending position information without requiring a user to manually input the position information. Therefore, in at least one embodiment of the present disclosure, the prompt signal includes position indication information of the game scene. On the one hand, it is able to send position information but does not require the player to manually input the position; on the other hand, there is no need to click to zoom in the mini-map, the operation is more coherent and simple, and the type of a signal can be selected. In an optional embodiment, a terminal receiving the prompt signal controlled by the player identifies the corresponding position in the mini-map according to the position indication, so that the player can intuitively determine the position indicated by the prompt signal through a visual indicator on a panoramic thumbnail of the game scene. The visual indicator may be a dynamic effect such as a flashing highlighting prompt. As another optional embodiment, after the local terminal sends the prompt signal, the position indicated by the prompt signal may also be identified in the mini-map, so that the player can obtain a good operation feedback.

It can be understood that in addition to the position indication information, the prompt signal may also include signal content information, which may be at least one of voice prompt information, text prompt information, and pattern prompt information. The signal content may include "attack", "retreat", "defense", "guard", "gather" or the like. For example, a reminding voice may be sent to terminals of other players (e.g., when a user selects "gather", audio information "gather" of voice reminding is sent to the terminals of other players), and voice reminding indication information may also be sent to the terminals of other players to indicate the terminals of other players to play the corresponding and pre-stored voice audio.

The signal processing method that provided by the present disclosure is quick, convenient, accurate and effective and it is possible to realize the functionality of sending of a custom position in a game scene. Meanwhile, the operation steps in the game process can be reduced. That is, a signal may be triggered to send by touching the signal icon with a single hand. Meanwhile, the finger is slid to control the position indicator in the mini-map to move from a current position to a specified position, and the finger is lifted to complete signal sending at the specified position. The signal processing method solves a technical problem that a signal sending mode is single and a custom position cannot be accurately provided in a mobile terminal game.

Figure 4:
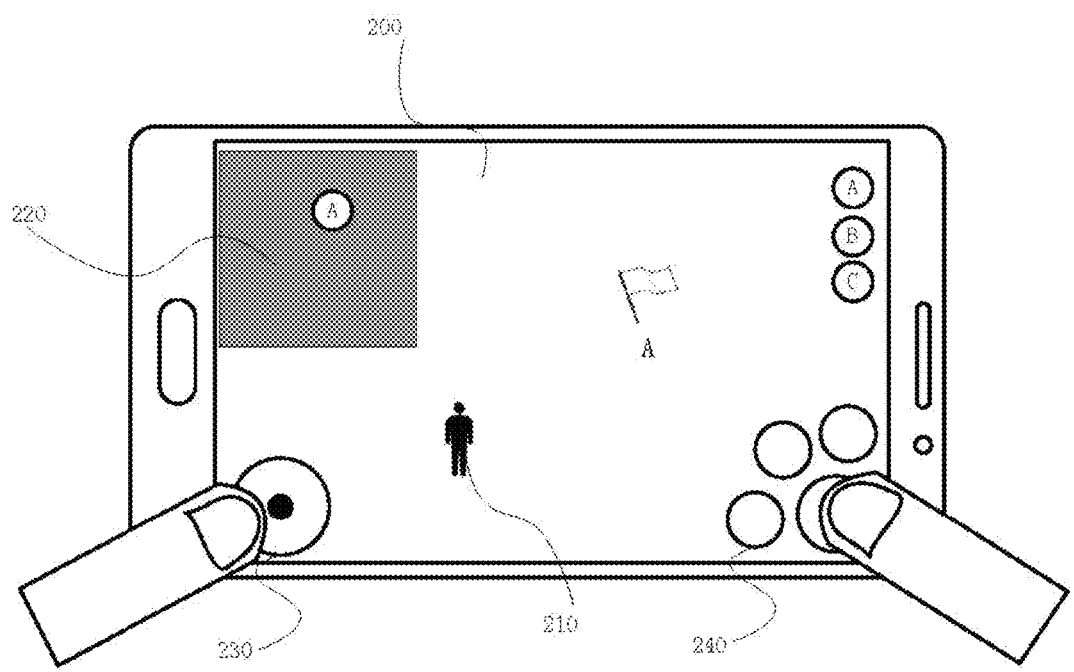
FIG. 4 is a schematic diagram of a second state of a graphical user interface according to an exemplary embodiment of the present disclosure.

FIG. 3 and FIG. 4 are used below to illustrate a specific embodiment of the present disclosure. For example, the signal icon A includes text and voice information with the content "attack".

When the finger leaves the signal icon A immediately after touching the signal icon A, a text and voice signal of "attack" is directly sent. The signal is located in the position of the virtual character 210 in the game scene.

After the finger touches the signal icon A, and the finger is moved from a position P1 where the signal icon A is located to a position P2. When detecting the moving distance of the finger is greater than a preset distance, a position selection assisting area 250 is generated at the upper right of the graphical user interface 200, and a touch sliding operation is detected in the position selection assisting area. The outer contour of the position selection assisting area 250 is geometrically similar to the outer contour geometrically of the mini-map 220, and the position selection assisting area 250 is rendered a preset transparency in order that players can identify this area easily.

When detecting a touch sliding operation in the position selection assisting area 250, a presentation view of the game scene is not changed along with the touch sliding operation. At this time, a position indicator 221 is provided in the mini-map 220, and the position of the position indicator 221 in the mini-map 220 is updated according to the touch sliding operation. For example, after executing touch sliding operation, the finger stays at the position P2, and the position indicator 221 stays at a position corresponding to the position P2 in the mini-map 220. Meanwhile, a signal icon A1 may also be generated at the position P2 where the finger stays in the position selection assisting area 250, and the signal icon A1 may also move along with the movement of the finger in the position selection assisting area 250. At this time, the signal icon A1 is visually displayed to be grayed. That is, the position where the signal icon A1 is located in the position selection assisting area 250 corresponds to the position where the position indicator 221 is located in the mini-map 220. The signal icon A and the signal icon A1 appear visually identical. For ease of description, the signal icons A and A1 are used to distinguish.

When the player lifts the finger at the position P2, the touch sliding operation is regarded to be ended. At this time, a corresponding prompt signal is sent. The prompt signal includes position indication information of the game scene and signal content information contained in the icon A. The position indication information of the game scene refers to position indication information indicated by the position indicator 221 corresponding to the signal icon A1 (position P2). The signal content information contained in the icon A refers to that "initiating an attack" is displayed at the position indicator 221 in the mini-map 220, and a voice is prompted.

When the player wants to cancel the signal sending operation, the finger is moved out of the position selection assisting area 250.

Figure 5:
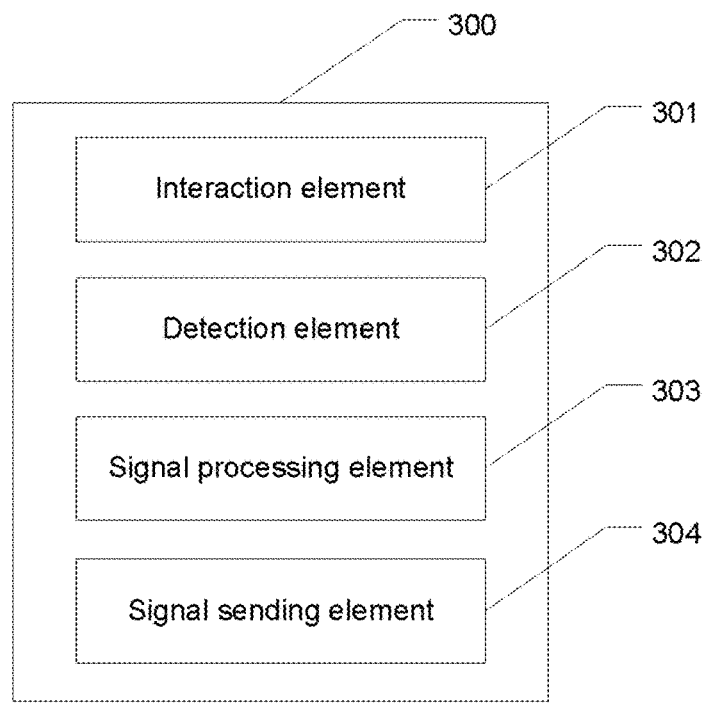
FIG. 5 is a block diagram of an information processing apparatus according to the present disclosure.

In another embodiment of the present disclosure, an information processing apparatus 300 is also applied to a mobile terminal having at least one processor for executing a software application and a touch screen which is rendered with a graphical user interface. As shown in FIG. 5, a software application is executed on a processor of a mobile terminal, and rendering a graphical user interface is performed on a touch display screen of the mobile terminal. Contents presented by the graphical user interface include a game scene, a virtual character, a mini-map, and at least one signal icon. The information processing apparatus 300 includes: an interaction element 301, a detection element 302, a signal processing element 303, and a signal sending element 304.

The interaction element 301 is configured to provide a touch area on the graphical user interface, and configure the virtual character to move in the game scene according to a touch operation received in the touch area.

The detection element 302 is configured to provide, when detecting a signal triggering operation acting on the at least one signal icon, a position selection assisting area on the graphical user interface, and detect a touch sliding operation acting on the position selection assisting area.

The signal processing element 303 is configured to provide, when detecting the touch sliding operation, a position indicator in the mini-map, and update a position of the position indicator in the mini-map according to the touch sliding operation.

The signal sending element 304 is configured to send, when detecting the touch sliding operation is ended, a prompt signal corresponding to the at least one signal icon, the prompt signal including position indication information of the game scene.

The specific details of the elements in the information processing apparatus have been described in detail in the corresponding information processing method, and therefore will not be described here.

It should be noted that although several components or elements of the device for action execution are mentioned in the above detailed description, such division is not mandatory. In fact, according to the implementation manners of the present disclosure, the features and functions of two or more components or elements described above may be embodied in one component or element. Conversely, the features and functions of one component or element described above may be further divided into multiple components or elements and embodied.

In another embodiment of the present disclosure, a computer-readable storage medium is also provided. A program product capable of implementing the above method of the present specification is stored thereon.

In some possible implementation manners, various aspects of the present disclosure may also be implemented in the form of a program product, which includes at least one program code for causing a terminal device to execute the steps according to various exemplary implementation manners of the present disclosure described in the "Exemplary Method" section of the present specification when the program product runs on a terminal device. It may use a portable Compact Disc Read-Only Memory (CD-ROM) and include at least one program code, and may run on a terminal device such as a personal computer. However, the program product of the present disclosure is not limited thereto, and in this document, the readable storage medium may be any tangible medium that contains or stores a program. The program may be used by or in conjunction with an instruction execution system, device, or apparatus.

The program product may employ any combination of at least one readable media. The readable medium may be a readable signal medium or a readable storage medium. The readable storage medium may be, for example but not limited to, an electrical, magnetic, optical, electromagnetic, infrared, or semiconductor system, apparatus, or device, or any combination of the above. More specific examples (non-exhaustive listings) of the readable storage medium include: electrical connectors with one or more wires, portable disks, hard disks, Random Access Memories (RAMs), ROMs, Erasable Programmable Read-Only Memories (EPROMs or flash memories), optical fibers, portable CD-ROMs, optical storage devices, magnetic storage devices, or any suitable combination of the above.

Figure 6:
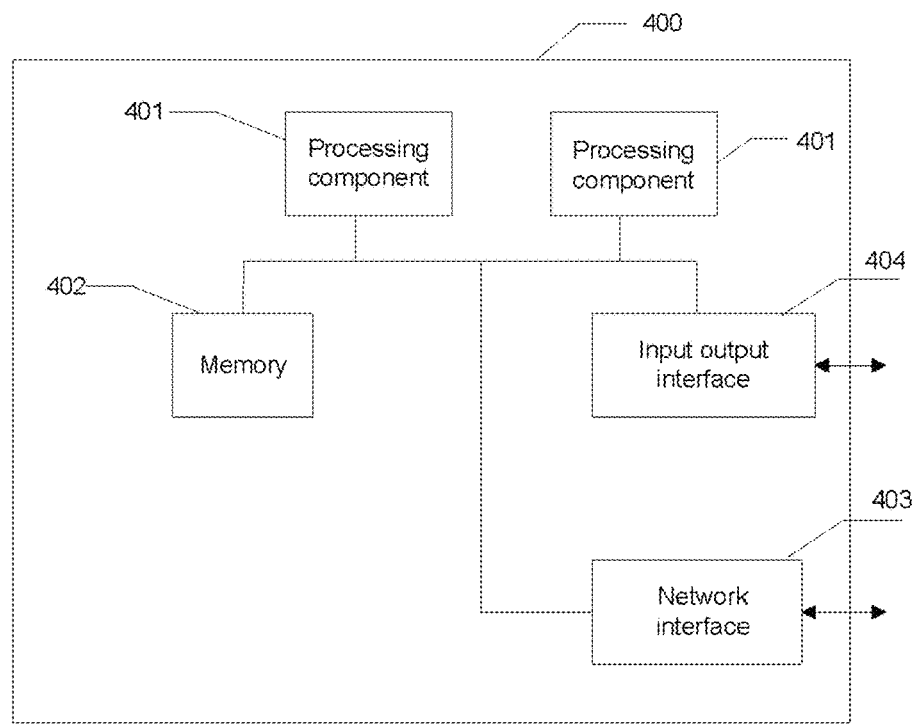
FIG. 6 is a component schematic diagram of an electronic device in an exemplary embodiment of the present disclosure.

In another embodiment of the present disclosure, an electronic device is also provided. As shown in FIG. 6, the electronic device 400 includes: a processing component 401, which may further include at least one processor, and a memory resource represented by at least one memory 402 and configured to store at least one instruction executable by the processing component 401, such as at least one application program. The at least one application program stored in the at least one memory 402 may include at least one component each corresponding to a set of instructions. In addition, the processing component 401 is configured to execute instructions to perform the above-described information processing method.

The electronic device 400 may also include: a power supply component, configured to perform power management on the electronic device 400; a wired or wireless network interface 403, configured to connect the electronic device 400 to a network; and an input output (I/O) interface 404. The electronic device 400 may operate based on an operating system stored in the memory 402, such as Android, iOS, Windows, Mac OS X, Unix, Linux, FreeBSD, or the like.

The sequence numbers of the foregoing embodiments of the present disclosure are merely for description and do not represent the advantages and disadvantages of the embodiments.

Apparently, the described embodiments are a part of the embodiments of the present disclosure, not all of the embodiments. On the basis of the embodiments of the present disclosure, all other embodiments obtained on the premise of no creative work of those skilled in the art fall within the protection scope of the present disclosure.

It should be noted that the specification and claims of the present disclosure and terms "first", "second", etc. in the foregoing drawings are used for distinguishing similar objects rather than describing a specific sequence or a precedence order. It will be appreciated that the terms used in such a way may be exchanged under appropriate conditions, in order that the embodiments of the present disclosure described here can be implemented in a sequence other than sequences graphically shown or described here. In addition, terms "include" and "have" and any variations thereof are intended to cover non-exclusive inclusions. For example, it is not limited for processes, methods, systems, products or devices containing a series of steps or elements to clearly list those steps or elements, and other steps or elements which are not clearly listed or are inherent to these processes, methods, products or devices may be included instead.

Moreover, the drawings are merely schematic illustrations of the present disclosure and are not necessarily drawn to scale. The same reference numerals in the drawings denote the same or similar parts, and thus a repeated description thereof will be omitted.

In the foregoing embodiments of the present disclosure, the description of each embodiment has its own emphasis. For the part not described in detail in one embodiment, reference may be made to the relevant description of other embodiments.

In some embodiments provided by the present disclosure, it shall be understood that the disclosed technical content may be implemented in other modes. For example, the apparatus embodiment described above is schematic. For example, the division of the components or elements is the division of logical functions, and there may be additional division modes during practical implementation. For example, a plurality of elements or assemblies may be combined or integrated to another system, or some characteristics may be omitted or may be not executed; and in addition, displayed or discussed mutual coupling or direct coupling or communication connection may be performed via some interfaces, and indirect coupling or communication connection between apparatuses or elements may be in an electrical form, a mechanical form or other forms.

The elements illustrated as separate components may be or may not be physically separated. Components for element display may be or may not be physical elements. That is, the components may be located at a place or may be distributed on a plurality of network elements. The aims of the solutions of the embodiments may be achieved by selecting some or all elements according to actual requirements.

In addition, all function elements in all embodiments of the present disclosure may be integrated in a processing element, or each element may exist separately and physically, or two or more elements may be integrated in an element. The integrated element may be implemented in a hardware form or may be implemented in a software function element form.

If the integrated element is implemented in the form of a software function element and is sold or used as an independent product, the product may be stored in a computer-readable storage medium. Based on this understanding, the technical solutions of the present disclosure may be substantially embodied in the form of a software product or parts contributing to the traditional art or all or some of the technical solutions may be embodied in the form of a software product, and a computer software product is stored in a storage medium, including a plurality of instructions enabling a computer device (which may be a personal computer, a server or a network device) to execute all or some of the steps of the method according to each embodiment of the present disclosure.

The above are exemplary implementation manners of the present disclosure, and it should be pointed out that those of ordinary skill in the art can also make several improvements and modifications without departing from the principle of the present disclosure. These improvements and modifications should also be regarded as the scope of protection of the present disclosure.

What is claimed is:

1. An information processing method, applied to a mobile terminal having at least one processor for executing a software application and a touch screen which is rendered with a graphical user interface, contents rendered on the graphical user interface comprising a game scene, a virtual character, a mini-map, and at least one signal icon, the method comprising:
providing a touch area on the graphical user interface, and configuring the virtual character to move in the game scene according to a touch operation received in the touch area;
when a signal triggering operation acting on the at least one signal icon is detected, providing a position selection assisting area on the graphical user interface;
when the touch sliding operation is detected, providing a position indicator in the mini-map, and updating a position of the position indicator in the mini-map according to the touch sliding operation; and
when an end of the touch sliding operation is detected, sending a prompt signal corresponding to the at least one signal icon, the prompt signal comprising position indication information of the game scene.

2. The information processing method as claimed in claim 1, further comprising:
after sending the prompt signal, identifying the position of the game scene indicated by the position indication information of the game scene in the mini-map.

3. The information processing method as claimed in claim 1, further comprising:
when the prompt signal sent by other terminals is received, identifying the position of the game scene indicated by the position indication information of the game scene in the mini-map.

4. The information processing method as claimed in claim 1, wherein the prompt signal further comprises at least one of the following: voice prompt information and text prompt information.

5. The method as claimed in claim 1, wherein the touch area is a virtual joystick control area.

6. The information processing method as claimed in claim 1, wherein the position indication information of the game scene comprises position information in the game scene corresponding to the current position of the position indicator in the mini-map.

7. The method as claimed in claim 1, wherein providing a position selection assisting area on the graphical user interface comprises:
rendering the position selection assisting area on the graphical user interface with preset transparency.

8. The method as claimed in claim 1, wherein an outer contour of the position selection assisting area is geometrically similar to an outer contour of the mini-map.

9. The method as claimed in claim 1, wherein updating the position of the position indicator in the mini-map according to the touch sliding operation comprises:
updating the position of the position indicator in the mini-map according to a touch track of the touch sliding operation.

10. An information processing apparatus, applied to a mobile terminal having at least one processor for executing a software application and a touch screen which is rendered with a graphical user interface, contents rendered on the graphical user interface comprising a game scene, a virtual character, a mini-map, and at least one signal icon, the apparatus comprising:
an interaction element, configured to provide a touch area on the graphical user interface, and configure the virtual character to move in the game scene according to a touch operation received in the touch area;
a detection element, configured to provide, when a signal triggering operation acting on the at least one signal icon is detected, a position selection assisting area on the graphical user interface, and detect a touch sliding operation acting on the position selection assisting area;
a signal processing element, configured to provide, when the touch sliding operation is detected, a position indicator in the mini-map, and update a position of the position indicator in the mini-map according to the touch sliding operation; and
a signal sending element, configured to send, when an end of the touch sliding operation is detected, a prompt signal corresponding to the at least one signal icon, the prompt signal comprising position indication information of the game scene.

11. A computer-readable storage medium, on which at least one computer program is stored, wherein the at least one computer program is executed by at least one processor to implement the information processing method as claimed in claim 1.

12. An electronic device, comprising:
at least one processor; and
at least one memory, connected with the at least one processor, and configured to store at least one executable instruction of the at least one processor,
wherein the at least one processor is configured to execute the at least one executable instruction, the at least one executable instruction comprising:
providing a touch area on a graphical user interface, and configuring a virtual character to move in a game scene according to a touch operation received in the touch area;
when detecting a signal triggering operation acting on at least one signal icon, providing a position selection assisting area on the graphical user interface, and detecting a touch sliding operation acting on the position selection assisting area;
when detecting the touch sliding operation, providing a position indicator in a mini-map, and updating a position of the position indicator in the mini-map according to the touch sliding operation; and
when detecting the touch sliding operation is ended, sending a prompt signal corresponding to the at least one signal icon, the prompt signal comprising position indication information of the game scene.

13. The information processing method as claimed in claim 1, wherein preset instruction information corresponding to each signal icon is set as default by the system or preset by a player through a preset function.

14. The information processing method as claimed in claim 1, wherein a plurality of signal icons corresponding to different instruction information are independently disposed on the graphical user interface; or, a plurality of sub-icons corresponding to different instruction information are enclosed in one signal icon.

15. The information processing method as claimed in claim 1, wherein the touch area is a visible area.

16. The information processing method as claimed in claim 1, wherein the touch area is an invisible area.

17. The information processing method as claimed in claim 16, wherein a visual guiding control is displayed in the touch area.

18. The information processing method as claimed in claim 1, wherein the signal triggering operation refers to a touch sliding operation acting on the at least one signal icon with a sliding distance exceeds a preset distance.

19. The information processing method as claimed in claim 1, wherein the signal triggering operation refers to a touch sliding operation acting on the at least one signal icon with a sliding time exceeds a preset duration.

20. The information processing method as claimed in claim 1, wherein the signal triggering operation refers to a click operation or a touch operation acting on the at least one signal icon.

\* \* \* \* \*